United States Patent
Greenfield et al.

(10) Patent No.: US 7,788,125 B2
(45) Date of Patent: Aug. 31, 2010

(54) DATA STRUCTURE AND ARCHITECTURE FOR PROCESSING TRANSACTION DATA

(75) Inventors: Steven J. Greenfield, Palm Harbor, FL (US); Jeff Mount, Palm Harbor, FL (US); Baxter Byerly, Brooksville, FL (US); James B. Clack, St. Petersburg, FL (US)

(73) Assignee: Catalina Marketing Corporation, St. Petersburg, FL (US)

( * ) Notice: Subject to any disclaimer, the term of this patent is extended or adjusted under 35 U.S.C. 154(b) by 1160 days.

(21) Appl. No.: 11/412,903

(22) Filed: Apr. 28, 2006

(65) Prior Publication Data

US 2006/0282348 A1 Dec. 14, 2006

Related U.S. Application Data

(60) Provisional application No. 60/682,007, filed on May 18, 2005.

(51) Int. Cl.
*G06F 17/30* (2006.01)
*G07G 1/00* (2006.01)
*G06Q 10/00* (2006.01)

(52) U.S. Cl. ............................... 705/10; 705/8; 705/28
(58) Field of Classification Search ................... 705/7, 705/10, 28
See application file for complete search history.

(56) References Cited

U.S. PATENT DOCUMENTS

| | | | | |
|---|---|---|---|---|
| 6,078,891 | A * | 6/2000 | Riordan et al. | 705/10 |
| 6,154,738 | A * | 11/2000 | Call | 1/1 |
| 6,976,000 | B1 * | 12/2005 | Manganaris et al. | 705/10 |
| 7,089,322 | B1 * | 8/2006 | Stallmann | 709/238 |
| 7,555,447 | B2 * | 6/2009 | Chinnappan et al. | 705/27 |
| 2001/0013011 | A1 * | 8/2001 | Day et al. | 705/14 |
| 2001/0034677 | A1 | 10/2001 | Farhat et al. | |
| 2004/0122735 | A1 * | 6/2004 | Meshkin | 705/14 |
| 2005/0038721 | A1 | 2/2005 | Goeckel et al. | |

OTHER PUBLICATIONS

Randolph E Bucklin, & Sunil Gupta. (1999). Commercial use of UPC scanner data: Industry and academic perspectives. Marketing Science, 18(3), 247-273. Retrieved Mar. 10, 2010, from ABI/INFORM Global. (Document ID: 47348027).*

(Continued)

*Primary Examiner*—Matthew S Gart
*Assistant Examiner*—Scott A Zare
(74) *Attorney, Agent, or Firm*—Neifeld IP Law, PC

(57) ABSTRACT

A reduced PID tag set specification represents POS transaction data in a manner that is largely retail store product specification independent. A reduced PID tag set specification is a tagged format specification in which a number of PID tags in the tagged format specification is less than the number of PIDs for products contained in RS POS CSs PID specification. In a preferred embodiment, there is only one tag set defined for identifying product identification datum as such. As a result, the product descriptions of all of the product identifications that exist in a retailer's product identification specification are lost when saving the same data in the preferred reduced PID tag set specification. However, saving the retailer's transaction data in a reduced PID tag set specification moots the need to know the retailer's product identification specification in order to receive, store, organize, and, to a certain extent, process the retailer's transaction data.

29 Claims, 2 Drawing Sheets

OTHER PUBLICATIONS

Corcoran, Cate T. (Apr. 1996). Client/server system tracks every purchase you make. InfoWorld, 18(16), 85. Retrieved Mar. 10, 2010, from ABI/INFORM Global. (Document ID: 9453915).*

PCT International Search Report PCT/US06/16080.

PCT Written Opinion PCT/US06/16080.

English translation of office action in associated application CN 2006800160288, dated Mar. 6, 2009.

Office action in associated application AU 2006248033, dated May 8, 2009.

Office action in associated application CN 2601776, dated Feb. 24, 2010.

* cited by examiner

DATA STRUCTURE AND ARCHITECTURE FOR PROCESSING TRANSACTION DATA

CROSS REFERENCE TO RELATED APPLICATIONS

This application claims priority to U.S. provisional application 60/682,007, filed May 18, 2005, titled "DATA STRUCTURE AND ARCHITECTURE FOR PROCESSING TRANSACTION DATA." The contents of 60/682,007 are hereby incorporated herein by reference.

FIELD OF THE INVENTION

This application relates to systems and methods for capturing, storing, structuring, transmitting, analyzing, and displaying data relating to marketing.

BACKGROUND OF THE INVENTION

Background Definitions

Vertical—The set of companies producing and selling a category of products to consumers. Such categories including: groceries; cooked foods; books; consumer electronics; gasoline; clothing; furniture; automobiles; and telecommunication services.

Supermarket—Relatively large retail stores having for sale in the store grocery product items for a large number of products. Supermarkets are all members of the groceries vertical.

VID—An acronym for Vertical IDentification.
RID—An acronym for Retailer IDentification.
RSID—An acronym for Retail Store IDentification.
SID—An acronym for Store IDentification.
PID—An acronym for Product IDentification.
CID—An acronym for Customer IDentification.
RSNID—An acronym for Retail Store Node IDentification, which is a unique identification inside a POS computer system for each transaction lane/POS, kiosk, or management I/O device.
TID—An acronym for transaction identification.
PI—An acronym for Product Item.
PIP—An acronym for Product Item Price.
POS—An acronym for Point Of Sale.
POS terminal—An input output device for receiving and displaying data for transactions occurring at a corresponding POS.
POS computer system—A computer system including at least one POS terminal for processing transaction data including sales of goods occurring at the POS terminal.
CS—An acronym for Computer System.
RS—An acronym for Retail Store.
POTS line—An acronym for a Plain Old Telephone Service line.
PID specification—A specification of the data format (such as binary, ASCII, extended ASCII) used to represent data and representation (correspondence of datum values such as character length and sequence of characters for string data values and numerical values for number data) used to corresponding data to product identification.
Transaction—An exchange of goods and/or services, including exchange of cash or credit for goods and services.
Transaction data—Data specifying transactions. Transaction data includes data conveying the following information: PID; PIP; number of PIs; PI discount; time of transaction including one or more of date and time; location of transaction identification information such identifications associated with one or more of country, state, county city, GPS location; RID; RSID; RSNID; cashier identification; CID; transaction total, coupon identification, coupon redemption value, and TID.

Trigger criteria is defined herein to mean criteria that my be met by transaction data.

Reward criteria is defined herein to mean criteria that my be met by transaction data to result in association of reward data with at least one CID.

Trigger data is defined herein to mean identification of data that may appear in transaction data for a specific transaction, such as a CID.

Reward data is defined herein to mean an instruction to a CS triggered by the occurrence of trigger data in a single transaction.

Retailer—The legal entity owning a set of retail stores.
UPC—An acronym for Universal Product Code.
UPC standard—A specification generally used in the groceries vertical to uniquely identify each grocery product with a code.
UPC-A—A specification of a sequence of 11 numerals defining UPC codes for products.
EAN-13—A specification of a sequence of 13 numerals defining UPC codes for products.
GTN—A specification for uniquely identifying each product and defining attributes of that product that are useful for business to business commerce.
XML—An acronym for Extensible Markup Language.
XML document—A data file formatted to a version of the XML specification, such as the 1.0 XML specification.
XML declaration—ASCII text at the beginning of an XML document that defines the XML version of the document.
XML element—A datum stored in an XML document.
Opening tag—Tag in a string of text preceding text representation of the datum in an XML document.
Closing tag—Tag in a string of text after text representation of the datum in an XML document.
XML Tags, or Tags—Text based identifiers defining representation of an XML element. Formally, a pair of tags, that encapsulate each XML datum element in a string of text characters. Text representation of an opening tag begins with a "<" and ends with a ">". Text representation of a closing tag begins with a "</" and ends with a ">".
Tag value—Value of a datum encapsulated by a pair of tags in an XML document.
Attribute—Text based identifier embedded within a tag, for identifying an attribute associated with the tag value of the XML element.
Attribute value—Value associated with the attribute of the XML element. Formally, in a conventional XML text representation, the attribute value follows both the text representing the attribute and an equal sign, and the attribute value is delimited by quotation marks.
DTD—Document type definition. Additional specification of content and syntax requirements, and meaning of elements and attributes, for an XML document
DTD file—A file in the format specified by XML containing a DTD.
Valid XML document—An XML document that conforms to a DTD of a DTD file identified in the XML document's DTD tag.
PCDATA—Text in an XML document that will be parsed by an XML parser.
Nested—The property of all XML documents that each pair of opening and closing tags in an XML document be embedded within other pairs of tags, limited by the constraint that each open tab has a corresponding closing tag in the XML document, with the exception of a single unpaired tag allowed to reference the location of a file containing a DTD, and with the exception that the highest level tag is not embedded within any other pair of tags.

GUI—An acronym for a graphical user interface.

DESCRIPTION OF PRIOR ART

First Prior Art System

Prior network architectures for processing transaction data generated by transactions at multiple POSs from multiple supermarkets included the following structural components: a central site CS, a plurality of supermarket POS CSs and a corresponding plurality of second CSs, one second CS and one supermarket POS CS located at each supermarket RS. The central site CS and each second CS were capable of modem communication via a POTS line. The second CS had a network link to the local loop or LAN of the corresponding supermarket's POS CS so that the second computer system could log transaction data transmitted from the POS terminals in the supermarket's POS CS.

The central site CS included one or more digital data processors, memory, and input output devices. The central site CS stored transaction data for transactions that occurred in the plurality of supermarkets.

The central site CS also stored (1) trigger criteria and related reward data and (2) trigger data including CIDs and associated reward data. The central site CS may also have stored reward criteria.

In addition, the central site CS computer system included a large number of modems for connecting to POTS lines, and network interface cards for connecting to the Internet or private networks.

Each supermarket POS CS included at least one digital data processor, a data store specifying store inventory and store transaction data, a local network, such as a local loop, and a plurality of POS terminals attached to the local network. In operation, each POS system generally functioned to log transactions in its respective store, update its store's inventory lists, and record its store's amounts purchased.

Each supermarket POS terminal generally included a printer, a scanner, a keyboard or touch pad, and mechanical structure for moving PIs on a conveyor belt.

Each second CS generally included a digital data processor, input-output devices, either a modem for connection to a telephone line or a data packet network interface card, memory for storing data, a network connection to the retail store local loop, and a second local network with second network connections to a plurality of second CS system printers.

The second CS was configured so that each one of the plurality of second CS printers was located at a corresponding POS, and the CS's memory stored the correspondence of each POS RSNID with the ID of the second CS printer located at the RS node having that RSNID.

The second CS performed the following functions. It:
received trigger data from the central site CS;
stored trigger data;
determined trigger data matches for each transaction during the transaction occurring at the POS;
transmitted reward data instructions upon determining trigger data matches with transaction data for a transaction;
stored (logged) transaction data for transactions occurring at the POS terminals in the POS system;
logged the occurrence of trigger data matches in transactions;
logged the transmissions of reward data instructions;
logged confirmation of recipient by a device of a reward data instruction, such as receipt by a second CS printer; and
transmitted log data to the central site CS.

The second computer compared in substantially real time transaction data appearing on the RS local loop against stored trigger data. When the second CS determined that trigger data existed in the transaction data for a single transaction, the second CS transmitted a reward data instruction, for example an reward data containing specified print instructions to the printer of the second CS but located at the corresponding POS terminal where the transaction was occurring.

The central site CS periodically, such as nightly, communicated with each second CS to obtain from the second CS logged data and transmit back to the same second CS trigger data and corresponding rewards.

Second Prior Art System

The supermarket POS CS may have performed the functions of the central site and second CSs noted above. This alternative included no central site CS and no second CS.

Third Prior Art System

A retailer central site CS controlled by a single retailer communicated with each of the retailer's plurality of RS POS CSs, in which each the retailer's own RS POS CSs included the functionality noted above for the second CS. Notably, in this situation, the retailers central site CS and RS POS CSs both had access to the retailers PID specification.

For the supermarket industry in the groceries vertical, inventory was and still is identified by UPC codes printed as numerals and bar codes on packing of PIs. The UPC-A specification may be replaced by the EAN-13 specification. The GTN specification is not generally used in the supermarket industry to identify products. Not all verticals employ a universally accepted PID specification. Each retail store or set of stores owned by a retailer may define and use its own PID specification for use to generate transaction data in its own POS RS CSs.

SUMMARY OF THE INVENTION

The present inventors recognize various limitations of the three prior art systems noted above.

First, implementing required hardware, such as the second CS had considerable labor, time, and often required legal review of national laws and regulations.

Second, maintaining the second CSs required providing security, obtaining suitable physical space in each RS, and maintaining a printer with attendant supplies of ink and paper at each POS.

Third, given the large number of PIs sold in any given RS, it would be very expensive to obtain and cross reference each retailer's PID specification to a common specification. However, such cross reference would be required in order to identify and uniformly categorize each datum defining each PID. Lacking such categorization, category based analysis would not be possible. Category based analysis however is generally be desirable in order to perform processing of criteria to relying upon categorization of PIDs.

Fourth, the ability of the second CSs to read and understand transaction data in a RS POS system depended upon access to the PID specification used in the collocated RS POS CS. Some of the second CSs relied upon identification of certain datum in a data stream to distinguish between data or data packets from distinct transactions and/or originating at distinct POS transaction terminals. Lack of access by the second CS to the retail store's PID specification would therefore preclude capture by the second CS of certain transaction data distinguishing between different transactions. Thus, each second CS may also have relied upon a priori knowledge of the PID specification to distinguish between and identify data from various transactions in the data stream transmitted in the POS computer system, and to store the data including such distinction.

OBJECTS OF THE INVENTION

Objects of the invention are to reduce the cost of storing, analyzing, displaying and marketing using POS retail store transaction data, to increase the ability to use POS retail store transaction data for analysis and marketing, and to maintain the security of POS retail store transaction data.

The present inventors conceived of a set of related concepts that overcome all of the foregoing problems and meeting the foregoing objects by providing a series of concepts utilizing a reduced PID tag set specification, as defined herein below, to represent POS transaction data in a manner that is largely retail store product specification independent.

The reduced PID tag set specification is a tagged format specification in which a number of PID tags identifying products in the tagged format specification is less than the number of PIDs for products contained in RS POS CSs PID specification. In a preferred embodiment, there is only one tag defined for associating with all product identification datum the fact that all such datum are product identifications. As a result, the descriptions of all of the product identifications that exist in a retailer's product identification specification are lost when saving the same data in the preferred reduced PID tag set specification. However, saving the retailer's transaction data in a reduced PID tag set specification moots the need to have the retailer's product identification specification in order to receive, store, organize, and to a certain extent, process, the retailer's transaction data.

In one aspect, we provide a novel network CS and method of using it wherein the network CS comprises: a central CS including a central CS database; at least a first RS CS including a first RS CS database, for at least accounting for inventory in a first RS; wherein said first RS CS database stores a RS PID specification, wherein said RS PID specification includes at least an association between product identifications and descriptions of corresponding products having said product identifications; and wherein said first RS CS database stores first RS CS transaction data for a first set of transactions; wherein said central CS database stores transaction data for said first set of transactions in a reduced PID tag set specification; wherein said reduced PID tag set specification specifies a number of PID tags identifying products in the tagged format specification that is less than the number of PIDs for products contained in RS POS CSs PID specification.

Dependent aspects include network CS wherein a number of PID tags identifying products reduced PID tag set specification is one; wherein said reduced PID tag set specification includes a tag set for specifying CID; wherein said reduced PID tag set specification includes a tag specifying product category; wherein said reduced PID tag set specification includes a tag specifying vertical; wherein said reduced PID tag set specification includes at least one tag specifying at least one of department, manufacturer, retailer product categorization, size, weight, and existence of discounts; wherein said reduced PID tag set specification includes at least one tag specifying at least one of "private label"; "not house brand"; "first manufacturer ID"; "second manufacturer ID", . . . ; "first product category"; "second product category", . . . ; "physical product instead of service"; "service, not physical product"; "high volume product"; "frequently discounted product"; and "seasonal product"; wherein said reduced PID tag set specification includes at least one tag specifying at least one of "member of retailer's shopper program"; "not a member of retailers shopper program"; categorizations of the shopper based upon the retailers analysis of transaction data for the transaction data associated with the CID such as: "frequent shopper"; "high spending amount per transaction shopper"; "regular shopper"; "irregular shopper"; "responds to questionnaire"; "frequent promotions user"; "price sensitive shopper"; "repeat purchase of first brand"; "repeat purchaser of second brand"; . . . ; "repeat purchase of first specified brand in first specified category"; and "repeat purchase of second specified brand in second specified category"; wherein said reduced PID tag set specification includes at least one tag specifying at least one of VID; RID; RSID; SID; RSNID; TID; and transaction date and time; further comprising a DTD defining said reduced PID tag set specification; wherein said reduced PID tag set specification includes at least one tag specifying at least one of transaction delimiter; PID; rebate identification; transaction dollar amount, RID, SID, RSNID, and CID; wherein said central CS stores in association with said first RS CS an RID and a RSID, and said first set of transactions stored in said reduced PID tag set specification in said central CS database is associated with said RID and said RSID; further comprising a code module for converting said first RS CS transaction data for a first set of transactions from said RS PID specification to said reduced PID tag set specification; wherein said code module resides in said RS CS; wherein said code module resides in said central CS; further comprising code for identifying correlations in said first set of transactions indicative of a first probability of purchase or non purchase of a particular product in a second time period based upon purchase or non purchase of one or more products in a prior first time period; further comprising code for identifying CIDs whose transaction data in said first set of transactions indicate said first probability, and code for associating with said CIDs reward data; further comprising code for transmitting said reward data in association with said CIDs to said first RS CS; wherein central CS database stores rules for processing transaction data originating from said first RS CS; further comprising a network interface enabling an owner of said first RS set up and implement processing rules on transaction data stored in said central CS database in said reduced tag set specification; wherein said processing rules depend at least in part upon values of data within said PID tags; and further comprising an analysis configuration module operable to provide retailers GUI and/or scripts access to instruct the central CS to perform the following actions:

(a) define trigger criteria and rewards criteria inter alia based upon PID, and (b) define trigger data and rewards data inter alia based upon PID;

(c) define rewards data associations with trigger criteria and trigger data; and (d) define constraints between items (a)-(c); and (e) define, transmit to, and receive instructions for transmitting and receiving data, including transaction data, trigger data, and rewards data, to and from said central CS.

Additional aspects include identifying correlations in said first set of transactions indicative of a first probability of purchase or non purchase of a particular product in a second time period based upon purchase or non purchase of one or more products in a prior first time period; code for identifying CIDs whose transaction data in said first set of transactions indicates said first probability, and code for associating with said CIDs reward data; code for transmitting said reward data in association with said CIDs to said first RS CS; further comprising implementing processing rules on transaction data stored in said central CS database in said reduced tag set specification; wherein said processing rules depend at least in part upon values of data within said PID tags; further comprising providing retailers GUI and/or scripts access to instruct said central CS to perform the following actions:
(a) define trigger criteria and rewards criteria inter alia based upon PID, and
(b) define trigger data and rewards data inter alia based upon PID;
(c) define rewards data associations with trigger criteria and trigger data; and
(d) define constraints between items (a)-(c); and
(e) define, transmit to, and receive instructions for transmitting and receiving data, including transaction data, trigger data, and rewards data, to and from said central CS.

DETAILED DESCRIPTION

Figure 1:
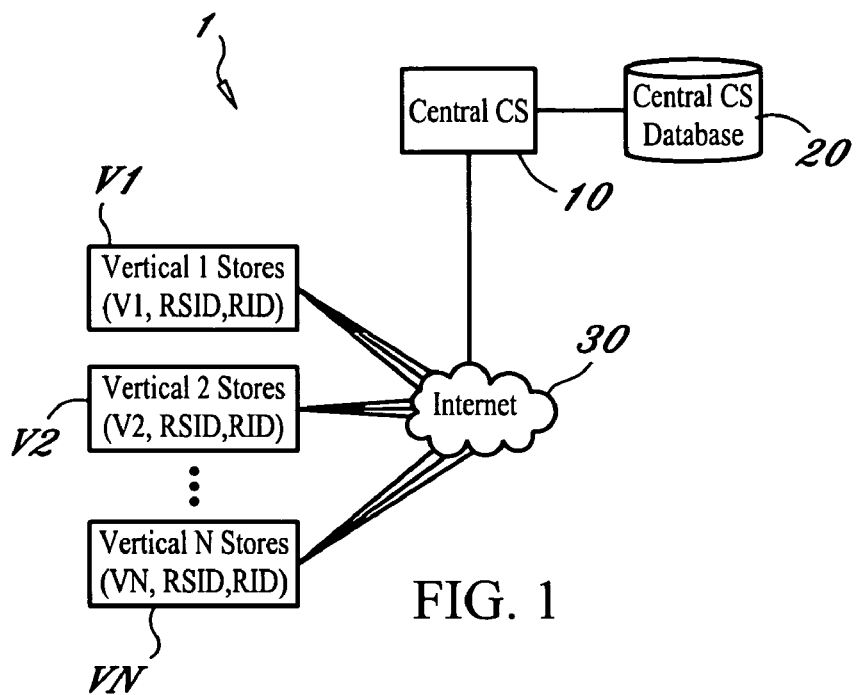
FIG. 1 is a schematic of computer network system 1.

FIG. 1 shows computer network system 1 including central CS 10, central CS database 20, network 30, such as the Internet, and computer systems associated with retail stores V1, V2, . . . VN.

Central CS 10 can associate with each store computer system V1 . . . VN identifications by vertical V, retailer identification RID, and retailer store identification RSID. That information can be associated with a fixed network address or a domain name so that Central CS 10 has sufficient address information to transmit data to a particular CS via network 30 and can identify information it receives via network 30 by V, RSID, and RID. Network CS 10 may use the V, RSID, and RID identification in formation by determining from it and stored rules depending there upon what processing to perform on received data.

Figure 2:
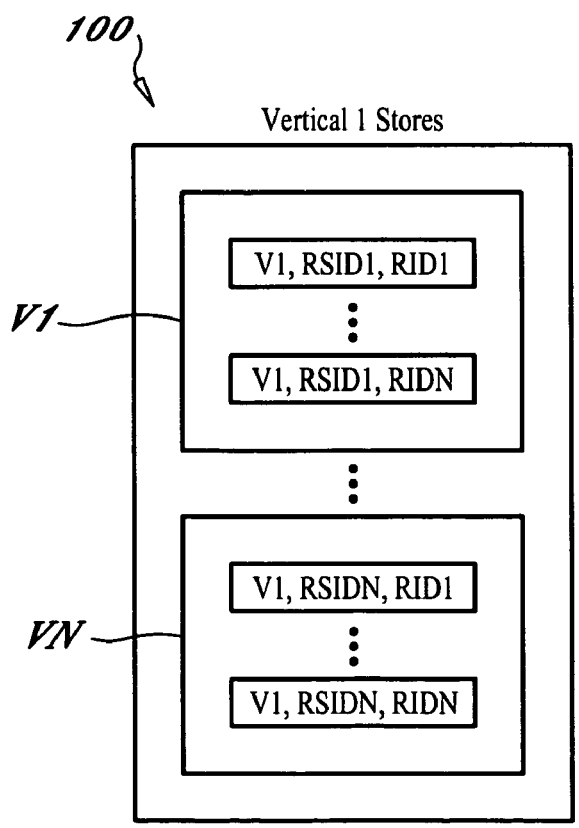
FIG. 2 is a schematic of a vertical stores identification specification 100.

FIG. 2 shows verticals V1 . . . VN indicating that a plurality of retail stores from a plurality of retailers may exist in each vertical.

Figure 3:
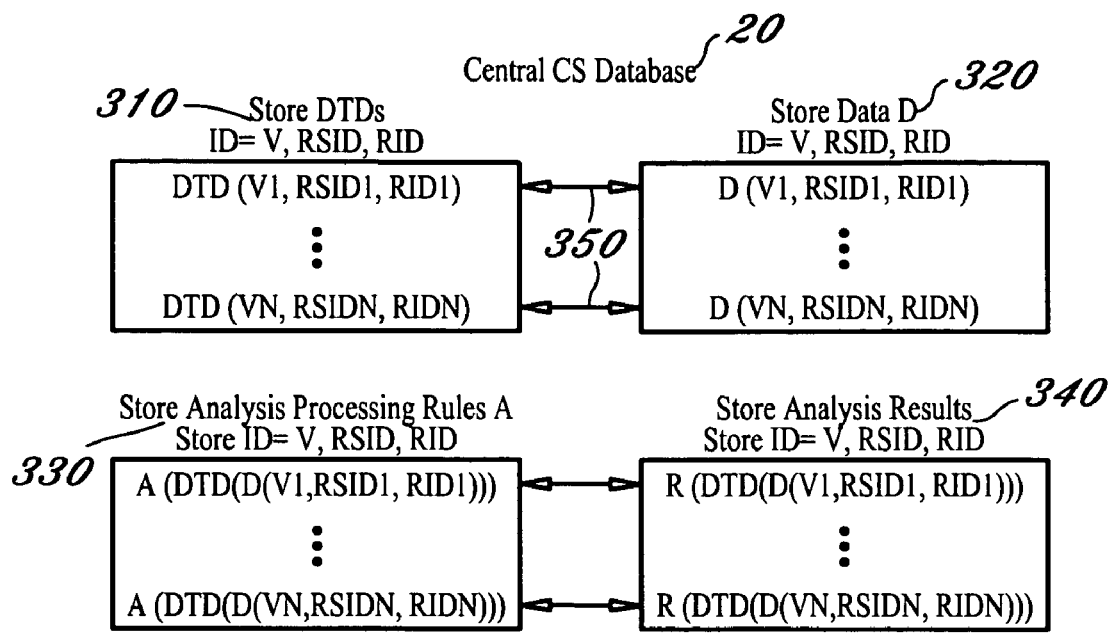
FIG. 3 is a schematic data structure for some data stored in central CS database 20 of FIG. 1.

FIG. 3 shows some data structures for date stored in central CS database 20 including store DTDs 310, store data 320, store analysis processing rules 330, and store analysis results 340. These data structures relate to use of reduced PID tag sets discussed herein. Store DTDs 310 stores document type definitions for each retail store. It may store the DTS in identification with a retail store for example using V, RSID, and RID, or by a specified name, or by a domain name or IP address associated with that retail store. Store data 320 stores retail store transaction data in a reduced PID tag set, again preferably identified by V, RSID, and RID. Lines 350 indicate correspondence of DTDs to store data 320. Store analysis processing rules 330 stores analysis and processing rules for applicable to the store data associated with the same V, RSID, and RID. Store analysis results 340 stores results of analysis and processing rules 330 on store data.

Figure 4:
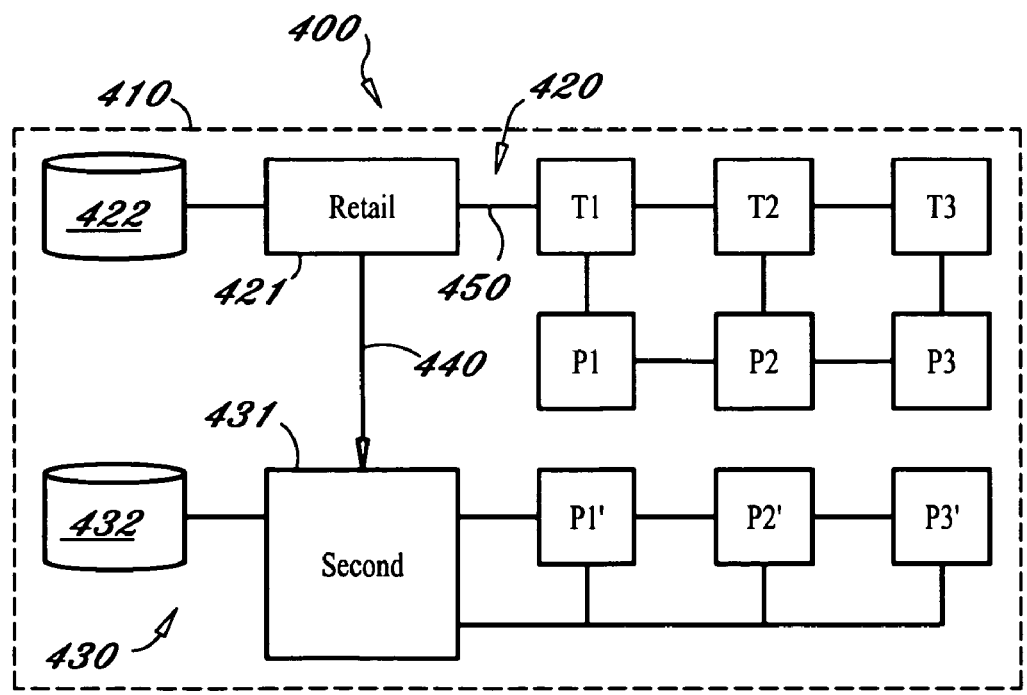
FIG. 4 is a schematic view of a digital network computer system 400 for a retail store.

FIG. 4 shows digital computer network system 400 for retail store 410 retail store POS CS 420 and second CS 430. Retail store POS CS 420 includes POS computer 421, POS computer database 422, terminals P1, P2, P3, and corresponding terminal printers T1, T2, T3. Second CS 430 includes second computer 431, second computer database 432, and printers P1', P2', and P3'. Printers f the second CS 430 are physically adjacent the printers/terminals having the corresponding number 1, 2, 3, of the retail store POS CS. Data link 440 enables the second computer 431 to listen in to transaction data on the network line 450 between the terminals P1, P2, P3, and the retail store POS CS 421. Second computer 431 can act on that data, for example, by synchronizing printing of a coupon at printer P1' targeted for CID when that CID is identified as read at terminal T1, or when a transaction in which that CID is completed at terminal T1. Either or both of computers 421, 431 may be capable of connecting to the Internet.

In embodiments implementing second computer 431, it functions to log transaction data for uploading to central CS 10, to respond to transaction data during a transaction by printing on printers P1', P2', and P3' information, such as coupons. Some of the coupons result from second computer 431 identifying a CID in the transaction, looking up in database 432 rewards data associated with the CID, and acting on the rewards data to print the coupon while the customer having the CID is at the corresponding terminal so that the customer can receive the printed coupon or other printed communication while at the terminal. In embodiments in which retail store POS CS 420 handles printing of targeted communications, retail store POS CS database 422 stores relevant rewards data in association with CIDs, and instructs printers P1, P2, P3, to print the corresponding coupon or targeted communication for a CID during the presence of the customer having that CID at the corresponding terminal.

A generic description of operation follows. In this generic description, a retail store CS includes any additional CSs, such as the second computer system discussed above, local to the retail store, from which retail store transaction data may be sent or received. Translation data from a retail store CS such as on of V1, V2, . . . VN for transaction in a corresponding RS are stored in that retail store CS in a reduced PID tag set specification. The data, stored in the reduced PID tag set specification, is transmitted from the retail store CS via network 30 to central CS 10. At central CS 10, the data received in the reduced PID tag set specification is stored in database 20 in association with an identification of the store. Central CS 10 performs analysis and processing rules stored in 330 on that data, and stores analysis results in 340. Some of the analysis results data 340 is transmitted from central CS 10 to the corresponding retail store CS from which the store data originated. If a second CS is present in the retail store, either the second CS or the retail store POS CS may be the network node transmitting store data to and receiving store data from the central CS.

What follows is a description of the reduced PID tag set concept and other concepts relating thereto.

Novel Reduced PID Tag Set Specification

A reduced PID tag set specification is defined herein to mean a tagged format specification in which a number of PID tags in the tagged format specification is less than the number of PIDs for products contained in RS POS CSs PID specification.

The first concept is storing transaction data in a reduced PID tag set specification. Data in that format can be transmitted to a central site CS for analysis.

For convenience, the reduced PID tag set specification is referred to herein below in the language used to describe XML documents. However, it should be understood the specifics of the representation of a conventional XML document, such as the use of text format and text characters to define XML elements is not necessary. The same data structures defined by an XML specification could for example be implemented in a binary file in which binary sequences of data, for example, replace the text elements used in conventional XML representations to define XML elements. Any such data structure providing the underlying functionality is within the scope contemplated by the inventors.

A fundamental difference between the proposed XML reduced PID tag set specifications and the prior art systems described in the background section is that the proposed XML reduced PID tag set specifications would be "PID independent." That is, there would be no one to one correspondence between XML tags and actual PIDs. Instead, in the conceptually simplest and preferred embodiment, the XML specification would define only a single pair of XML tags (a start tag and an end tag) defining the datum between the tags as a containing product identification data, PID data. In implementation, there may in fact be a set of more than one different PID tags, depending on the amount of PID data definition the retailer decides to incorporate into the implementation of the reduced PID tag set specification DTD for the retailer's transaction data.

For example, neither the RS POS CS's PID format (ASCII, binary, extended ASCII, etc) and RS POS CS's representation in that format of PIDs (number of binary, ASCII, or extended ASCII characters) are needed in order for PID data so formatted and represented in the RS POS CS's to be defined in an XML reduced PID tag set specification in an XML as PID data. Instead, the RS POS CS's PID data regardless of its format and representation may be sandwiched between any pair of tags defined in a XML reduced PID tag set specification identifying that sandwiched there between is PID data.

In a preferred embodiment, the reduced PID tag set specification includes only a single pair of tags to identify any and all PID as PID data, regardless of which actual product each such PID actually specifies in the retail stores PID specification. In the preferred embodiment, the reduced PID tag set specification defines attributes categorizing the tagged datum. The transaction data values corresponding to these attributes, if provided to the computer system generating the tagged data from the native transaction data my be used to provide partial or complete categorization to each tagged datum.

For example, the computer generating the tagged data may have a partial specification of native POS transaction data format that identifies a department of a store. If so, the tagged data may associate via a determined attribute value the department associated with the datum identifying a product. Similarly, any other attribute of the product identification, such as manufacturer, retailer product categorization, size, weight, existence of discounts, for which the computer generating the tagged data has knowledge, may be included as attribute values in each tagged datum identifying a product.

The results of the analysis, such as trigger data and rewards data can be transmitted to one or more CS in the same reduced PID tag set specification. If the computer receiving the results of analysis in the reduced PID tag specification format has access to the corresponding retail store's PID specification, it can then identify from the datum stored in each pair of PID tags, the product items to which the tagged data relates. Thus, the central site CS and the retailer POS CS can transmit, process, and use the results of processing, without the central site CS knowing the identification of products indicated by the retailer POS CS's transaction data.

For example, the XML specification may include different tags, or define XML attributes included inside of tags defining the encapsulated product identifier. For examples, the following PID categorizations may be included in the XML specification as PID XML tags, or PID XML attributes: "private label"; "not house brand"; "first manufacturer ID"; "second manufacturer ID", . . . ; "first product category"; "second product category", . . . ; "physical product instead of service"; "service, not physical product"; "high volume product"; "frequently discounted product"; "seasonal product". In the foregoing list, "private label" means a product having the retail store's brand name label affixed to it, for example a "PathMark" label for an item purchased in a PathMark company's retail store; first manufacturer ID means the name of a manufacturer, for example General Mills Corporation; "first product category" may be for example the 16 ounce container size orange juice category, the orange juice category, or the fruit juice category.

In addition to PID tags and attributes, the XML specification may provide tags and/or attributes for other transaction data, enabling this information to be included in the XML document (if provided by the retailer in a DTD or the like for that retailers transaction data). This data includes CID and CID associated information, including: CID; "member of retailer's shopper program"; "not a member of retailers shopper program"; categorizations of the shopper based upon the retailers analysis of transaction data for the transaction data associated with the CID such as: "frequent shopper"; "high spending amount per transaction shopper"; "regular shopper"; "irregular shopper"; "responds to questionnaire"; "frequent promotions user"; "price sensitive shopper"; "repeat purchase of first brand"; "repeat purchaser of second brand"; . . . ; "repeat purchase of first specified brand in first specified category"; "repeat purchase of second specified brand in second specified category"; . . . .

Moreover, the XML specification may provide tags and/or attributes for other transaction data including VID; RID; RSID; SID; RSNID; TID; and transaction date and time.

The conceived XML specification may be defined by a Document Type Definition (DTD) as readily known in the art of XML data structures implementing the foregoing tagging structure.

Preferably, the markup language, which is referred to herein below as XML for simplicity, specifies the type of each tagged datum, such as tags defining encapsulated data for: transaction delimiter; PID; rebate identification; transaction dollar amount, RID, SID, RSNID, and CID.

As noted above, markup languages are usually implemented with text based tags, but other implementations equivalent to markup languages such as XML are known and may be used, such as using binary values instead of alphanumerics for tags.

Preferably, the XML data received at the central site CS is initially identified by RID and RSID, and then loaded into a central site data warehouse to which the central site has read and write permission and relatively high speed of data access. The central site data warehouse stores transaction data for a relatively long period of time, such as a year. The data warehouse would segment data from each retailer in separate files or folders or directories such that the data for different retailers is each functionally in a distinct database, whether relational or XML, directory based, file based, or logical device based.

Novel PID Category Based Analysis at a Central Site

The second concept is enabling PID category based analysis at the central site CS without requiring the central site CS to have access to the RS POS CSs' PID specification. There are two distinct concepts enabling that category based analysis.

First, the inventors conceived of mechanisms to enable the entity owning the corresponding RS, which is an entity that has access to the RS POS CSs PID specification, to specify what analysis for the central site CS to perform on their RSs' transaction data. The entity owning the corresponding RSs is therefore able to specify category based analysis due to the RS owner's access to the RS POS CSs PID specification despite the fact that the central site CS does not have access to the corresponding RS's PID specification.

Second, the inventors conceived of the central site CS employing an objective correlation analysis, discussed further herein below, to a set of transaction data for a relatively large number of distinct CIDs to identify statistical likelihoods that the existence of any particular pattern of purchasing in any one consumer's purchase history in a first earlier time period indicates a statistical likelihood of that consumer purchasing or not purchasing any specified product in a subsequent second time period. Thus, the central site CS could statistically analyze data from each RS or set of RSs known to use the same retail store PID specification for identifying products and the same CIDs for identifying customers (such as RSs all owned by the same retailer) for a statistically significant number of such CIDs, to identify a particular purchase set of products, redemptions, or the like, in one or more time periods correlated with a purchase or lack of purchase of some specified product in a subsequent time period, identify correlations for each CIDs record in the retailer's transaction data to the foregoing particular purchase set, and base a decision whether to offer an incentive to that CID relating to the specified product (such as offering the consumer having the CID an incentive to buy the product having the specified PID when the correlation indicates the consumer is unlikely to purchase the specified product, or offering the consumer an incentive to buy a private label competing product to the specified product when the correlation indicates the consumer is unlikely to purchase the specified product.) Thus, even lacking the actual RS POS CS's PID specification, the central site CS can objectively identify patterns in a consumer's purchase behavior, and generate consumer specific trigger data and associated rewards data.

It should be noted that the objective correlation analysis generated trigger data and rewards data may but need not rely upon any data provided by the retailer in the XML reduced PID tag set specification including its associated DTD. For example, the analysis may use any categorization provided by the retailer in determining what trigger data to generate and what rewards data to generate and associate with trigger data.

For example, assume the retailer provides product category and manufacturer identification to the central site CS via the XML specification. Then, the central site CS can include rules for example offering incentives to consumers likely to purchase a first product in a first category the first product generated by first manufacturer, to purchase from a second manufacturer of a product in that category, or to purchase from a second category a product from the same manufacturer.

The central site CS can be programmed to automatically generate the trigger data and rewards data based upon rules applicable to the resulting correlations, or it may be programmed to allow via input output to apply rules to generate trigger data and rewards data. Thus, for example, the retailer owning the corresponding RS may decide based upon review of the correlation data and other business considerations, such as the availability of manufacturer compensation for coupons or rebates, or promotions it knows that its competitors are offering, what promotions rules to apply to its transaction data.

As discussed below, one aspect of this invention is an interface enabling entities, such as manufacturers and retailers, that is, entities entitled to access to certain transaction data and analysis thereof by the central site CS, to effectively access that data and effectively perform useful analysis including specifying any of trigger criteria and rewards criteria to generate and use trigger data and rewards data.

Novel Modular Software Implementation

The third concept is modularizing several of the functions performed by the second CS so that those functions are platform independent. As a result, for example, the functions previously performed by the CS may be performed by any processor, such as one or more processors associated with one or more POS terminals, one or more processors associated with the POS computer system, or by the second CS.

The inventors conceive of providing an XML conversion module operable for example within the POS CS to convert the data structure for the transaction data from one of the POS system's data structure for transaction data to the XML reduced PID tag set specification. This module could be installed and or operated by or operating on one or more of the processors in a POS system, such as the POS CSs', the POS transaction terminals', or the POS printers' processors. This module could also be installed on by any other one or more CSs having access to the POS CSs PID specification, for example, this module could reside on a corporate CS to which more than one RS POS CS transmits its transaction data.

In practice, a processor having to the XML reduced PID tag set specification receives data either in the format provided by the POS terminals, or an intermediate format after intermediate processing, such as by the RS POS controller (CPU processor) (either reading the data from a stored file or reading a data stream in transmission), and also takes as input the relevant novel XML specification, and runs code to convert the transaction data format to XML reduced PID tag set specification.

The inventors conceive of providing a transmission module operable to send transaction data in the novel markup format to the central site CS and to and receive data resulting from analysis from a central site CS.

The inventors conceive of providing a transmission instruction module operable to instruct the transmission module when to send XML data, and in some cases instruct the transmission module what XML data to send. These events include generation of specified data in transaction data, preset times, and poling requests from an CS external to a RS POS CS, RS POS processor load, and transaction data file size. The module may function by running rules against system events to determine what data to have the transmission module send, where to send it (i.e., to a specified IP address or URL address); when to send the XML data; and what XML data to send. This module could also specify transmission to one or more than one address, example from various domain names or IP addresses associated with the central site CS so as to distribute load of transmission to the central site over various network lines. For example one rules could include: instructions triggered by a system event for example of a specified an CID contained in a transaction record but not in a local retail store CID database; instructions based upon size of a local data file, such as one or more XML files containing transaction data; based upon a occurrence of predetermined specified system time (daily, or the like, at a specified time).

The inventors conceive of providing an analysis configuration module operable to provide retailers GUI and/or scripts access to configure analysis (specify trigger criteria, rewards criteria, trigger data, and rewards data, and associations there between) of their RSs' transaction data stored by the central site CS. This module enables the retailer of each S or chain of RSs to instruct the central site CS to perform the following actions:

(a) define trigger criteria and rewards criteria inter alia based upon PID, and
(b) define trigger data and rewards data inter alia based upon PID;
(c) define rewards data associations with trigger criteria and trigger data; and
(d) define constraints between items (a)-(c)
(e) define transmit to and receive instructions for transmitting and receiving data (transaction data, trigger data, and rewards data) to and from the central site CS, and any other CSs such as the RS POS CSs and the retailer's or a manufacturer's corporate CS;
(f) where to transmit to and receive from data specified in (e) (directly to an address for a RS POS CS; address for a processors in a RS POS CS; address for a processors in a second CS associated with the corresponding RS; address for another CS that communicates with the retailers RS POS CSs such as a corporate CS or a manufacturer's CS.

The analysis configuration module would include security enabling each retailer or manufacturer access only to specified data, such as for a retailer data from that retailer's RSs, and for a manufacturer, manufacturers sales an promotions statistics for that manufacturers' promotions available for compensation to retailers fulfilling those rewards. Preferably the analysis configuration module provides GUI access via the World Wide Web (WWW) to users. Preferably the GUI allows retailer user to configure Boolean combinations of processing rules for operation against that retailer's data, to define a subset of CIDs from that retailer's data suitable for a targeted deliverable. Preferably, the GUI enables the user to define reward instructions (set of instructions for a POS CS to act on) to deliver a reward, and associate that reward with the subset of CIDs. Preferably, the analysis configuration module enables a reward data to automatically be associated with a trigger criteria, such that a specified set of processing rules would result in a determined reward without the user having to select what reward to associate with the subset of CIDs. For example, the analysis configuration module might be programmed to select a reward to be paid by a retailer only from rewards for which one or more manufacturers had agreed to reimburse the retailer upon the retailer paying the reward.

The modular software enables a second analysis configuration module located in the RS POS CS (installed or operable on any processor in the RS POS CS including processors in the printers, POS terminals, POS CS, and second CS) to perform certain analysis data processing.

For example, a subset of the rules for a retailer specified via the GUI of the analysis configuration module may be downloaded to the RS POS system of the second CS and run periodically or in real time (during each transaction) against transaction data generated or stored in the RS POS CS or the second CS, to generate in the RS trigger data and rewards data. For example, trigger criteria that to not require manufacturer compensations to retailers upon a customer obtaining the reward specified in the associated rewards data may be second analysis configuration module and run locally at the RS.

Moreover, inventors conceive of an analysis location determination module that determines which trigger criteria and rewards criteria rules to run locally at each RS, remotely at a retailer corporate CS, or remotely at the central site CS, which can determine and instruct the respective computers what analysis rules they should run. For example, the analysis location determination module might be programmed to decide that any Boolean combinations of processing rules that required, for example, scanning data from only the relatively recent past (such as within 1, 2, or 7 days), or that required no scanning of data from the past (depending only upon the existence data for a current transaction meeting trigger criteria), occurs locally in the RS, determine whether the RS POS, which processors therein, or the second CS should preform that processing, and that the central site CS should process all trigger and rewards criteria requiring any past data or past date from more than 1, 2, or 7 days in the past, and issue suitable authoritative instructions to the foregoing CSs.

The inventors conceive of a delivery mode determination module, which would determine that portion of a rewards data specifying how to deliver the data to the customer of an associated CID. The delivery mode determination module would determine either during processing of trigger criteria rules or when trigger data matched transaction data during a transaction whether to for example instruct a POS printer or a second CS printer at the POS to print the specified reward, whether to print the reward elsewhere and postal mail it to an postal address, to post the reward on a web site, to email the reward to an email address, to send a text or audio message to a cellular phone number, PDA, or any other mechanism to transmit the information specified in the rewards data to an address associated with the CID associated with related transaction data.

An example of a retail store PID, a first reduced tag set specification for that retail store PID, and an alternative second reduced tab set specification for that retail store PID follows. The retail store PID specification corresponds to data stored in current retail store CS databases.

A. RS PID Specification

| Category description | Category |
| --- | --- |
| 1. | Fresh fish |
| 2. | Beer |
| ... | |
| 7. | Detergent |
| ... | |
| 14. | Cereal - small packages |
| ... | |
| 20. | Canned ice cream |

| Product description | Category | Product identification |
| --- | --- | --- |
| Soapy soap - 1 pound box | 007 | 000001 |
| Cereal brand cereal pack | 014 | 000002 |
| Icy brand Ice cream can | 020 | 000003 |

B. First Reduced PID Tag Set Specification
No category tag identification
Product tag identification =<prod></prod>

The specification of each of the three products identified above would be as follows.
<prod>000001</prod>

\<prod\>000002\</prod\>
\<prod\>000003\</prod\>

In this reduced PID tag set specification, the data "000001"; "000002"; and "000003" are identified as product identification data by the enclosed opening and closing tags \<prod\> and \</prod\>. The category identification, category description, and product description data are not retained in this reduced PID tag set specification. PID data in the retail store PID specification may be identified as PID data for example by the delimitation of data elements or padding of data elements existing in a data file in the retail store PID specification format. Alternatively, PID data in the retail store PID specification may be identified as PID data by identifying the number of numerical characters, in this example 6, in a sequence.

C. Second Reduced PID Tag Set Specification

Category tag identification =\<cat\>\<cat\>
Product tag identification =\<prod\>\<prod\>

The specification of each of the three products identified above would be as follows.

\<prod\>000001\<cat\>007\<cat\>\</prod\>
\<prod\>000002\<cat\>014\<cat\>\</prod\>
\<prod\>000003\<cat\>020\<cat\>\</prod\>

In this reduced PID tag set specification, the data "000001"; "000002"; and "000003" are identified as product identification data by the enclosed opening and closing tags \<prod\> and \</prod\>. The product description data corresponding to product identification data is not retained in this reduced PID tag set. The category identification data is retained by enclosing the category identifier, 007, 014, or 020, in \<cat\> tags within the pair of \<prod\> tags for the corresponding product identification data. The association of category desription data to category identification data may or may not be retained in this reduced PID tag set. PID data and category data in the retail store PID specification may be identified as such for example by the delimitation of data elements or padding of data elements existing in a data file in the retail store PID specification format. Alternatively, PID data in the retail store PID specification may be identified as PID data by identifying the number of sequential numerical characters, in this example 6 for PID data and 3 for category ID data.

The invention claimed is:

1. A network computer system (CS) comprising:
   a central CS including a central CS database;
   at least a first retail store (RS) CS including a first RS CS database, for at least accounting for inventory in a first RS;
   wherein said first RS CS database stores a RS product identification (PID) specification, wherein said RS PID specification includes at least an association between product identifications and descriptions of corresponding products; and
   wherein said first RS CS database stores first RS CS transaction data, in said RS PID specification, for a first set of purchase transactions, wherein transaction data stored for each purchase transaction in said first set of purchase transactions includes PIDs of items purchased and a customer identification (CID);
   wherein said central CS database stores transaction data for said first set of purchase transactions in a reduced PID tag set specification, such that transaction data stored for each purchase transaction of said first set of purchase transactions includes PIDs of items purchased and a CID;
   wherein said reduced PID tag set specification specifies a number of PID tags identifying products in the tagged format specification that is less than the number of PIDs for products contained in said RS PID specification;
   wherein said first RS CS is structured to convert said first RS CS transaction data stored in said RS PID specification to first RS CS transaction data represented in said reduced PID tag set specification, thereby losing association of product identifications with description of corresponding products, such that description of a product cannot be determined from said first RS CS transaction data represented in said reduced PID tag set specification;
   wherein said first RS CS is structured to transmit said first RS CS transaction data represented in said reduced PID tag set specification to said central CS; and
   wherein said central CS is structured to perform objective correlation analysis on those purchase transactions in said first RS CS transaction data represented in said reduced PID tag set specification that said central CS received from said first RS CS, and that contain a specific CID, to determine whether to associate trigger data with said specific CID.

2. The network CS of claim 1 wherein said number of PID tags identifying products in said tagged format specification is one.

3. The network CS of claim 1 wherein said reduced PID tag set specification includes a tag set for specifying CID.

4. The network CS of claim 1 wherein said reduced PID tag set specification includes a tag specifying product category.

5. The network CS of claim 1 wherein said reduced PID tag set specification includes a tag specifying vertical.

6. The network CS of claim 1 wherein said reduced PID tag set specification includes at least one tag specifying at least one of department, manufacturer, retailer product categorization, size, weight, and existence of discounts.

7. The network C S of claim 1 wherein said reduced PID tag set specification includes at least one tag specifying at least one of "private label"; "not house brand"; "first manufacturer ID"; "second manufacturer ID", . . . ; "first product category"; "second product category", . . . ; "physical product instead of service"; "service, not physical product"; "high volume product"; "frequently discounted product"; and "seasonal product".

8. The network CS of claim 1 wherein said reduced PID tag set specification includes at least one tag specifying at least one of "member of retailer's shopper program"; "not a member of retailers shopper program"; categorizations of the shopper based upon the retailers analysis of transaction data for the transaction data associated with the CID such as: "frequent shopper"; "high spending amount per transaction shopper"; "regular shopper"; "irregular shopper"; "responds to questionnaire"; "frequent promotions user"; "price sensitive shopper"; "repeat purchase of first brand"; "repeat purchaser of second brand"; . . . ; "repeat purchase of first specified brand in first specified category"; and "repeat purchase of second specified brand in second specified category".

9. The network CS of claim 1 wherein said reduced PID tag set specification includes at least one tag specifying at least one of vertical identification (VID); retailer identification (RID); retail store identification (RSID); store identification (SID); retail store node identification (RSNID); transaction identification (TID); and transaction date and time.

10. The network CS of claim 1 further comprising a document type definition (DTD) defining said reduced PID tag set specification.

11. The network CS of claim 1 wherein said reduced PID tag set specification includes at least one tag specifying at least one of transaction delimiter; PID; rebate identification; transaction dollar amount, retailer identification (RID), store identification (SID), retail store node identification (RSNID), and CID.

12. The network CS of claim 1 wherein said central CS stores in association with said first RS CS an retailer identification (RID) and a retail store identification (RSID), and said first set of transactions stored in said reduced PID tag set specification in said central CS database is associated with said RID and said RSID.

13. The network CS of claim 1 further comprising a code module for converting said first RS CS transaction data for a first set of transactions from said RS PID specification to said reduced PID tag set specification.

14. The network CS of claim 13 wherein said code module resides in said RS CS.

15. The network CS of claim 13 wherein said code module resides in said central CS.

16. The network CS of claim 1 further comprising code for identifying correlations in said first set of transactions indicative of a first probability of purchase or non purchase of a particular product in a second time period based upon purchase or non purchase of one or more products in a prior first time period.

17. The network CS of claim 16 further comprising code for identifying CIDs whose transaction data in said first set of transactions indicate said first probability, and code for associating with said CIDs reward data.

18. The network C S of claim 17 further comprising code for transmitting said reward data in association with said CIDs to said first RS CS.

19. The network CS of claim 1 wherein central CS database stores rules for processing transaction data originating from said first RS CS.

20. The network CS of claim 1 further comprising a network interface enabling an owner of said first RS set up and implement processing rules on transaction data stored in said central CS database in said reduced tag set specification.

21. The network CS of claim 20 wherein said processing rules depend at least in part upon values of data within said PID tags.

22. The network CS of claim 1 further comprising an analysis configuration module operable to provide retailers graphical user interface (GUI) and/or scripts access to instruct the central CS to perform the following actions:
 (a) define trigger criteria and rewards criteria inter alia based upon PID, and
 (b) define trigger data and rewards data inter alia based upon PID;
 (c) define rewards data associations with trigger criteria and trigger data; and
 (d) define constraints between items (a)-(c); and
 (e) define, transmit to, and receive instructions for transmitting and receiving data, including transaction data, trigger data, and rewards data, to and from said central CS.

23. A method of using a network computer system (CS) comprising:
 storing in a first retail store (RS) CS database of a first RS CS a RS production identification (PID) specification, wherein said RS PID specification includes at least an association between product identifications and descriptions of corresponding products; and
 storing in said first RS CS database, in said RS PID specification, first RS CS transaction data for a first set of purchase transactions, wherein transaction data stored for each transaction in said first set of purchase transactions includes PIDs of items purchased and a customer identification (CID);
 storing in a central CS database of a central CS transaction data for said first set of purchase transactions in a reduced PID tag set specification;
 wherein said reduced PID tag set specification specifies a number of PID tags identifying products in the tagged format specification that is less than the number of PIDs for products contained in said RS PID specification;
 said first RS CS converting said first RS CS transaction data stored in said RS PID specification to first RS CS transaction data represented in said reduced PID tag set specification, thereby losing association of product identifications with description of corresponding products, such that description of a product cannot be determined from said first RS CS transaction data represented in said reduced PID tag set specification;
 said first RS CS transmitting said first RS CS transaction data represented in said reduced PID tag set specification to said central CS; and
 said central CS performing objective correlation analysis on those purchase transactions in said first RS CS transaction data represented in said reduced PID tag set specification that said central CS received from said first RS CS, and that contain a specific CID, to determine whether to associate trigger data with said specific CID.

24. The method of claim 23 further comprising identifying correlations in said first set of transactions indicative of a first probability of purchase or non purchase of a particular product in a second time period based upon purchase or non purchase of one or more products in a prior first time period.

25. The method claim 24 further comprising code for identifying CIDs whose transaction data in said first set of transactions indicates said first probability, and code for associating with said CIDs reward data.

26. The method of claim 24 further comprising code for transmitting said reward data in association with said CIDs to said first RS CS.

27. The method of claim 23 further comprising:
 implementing processing rules on transaction data stored in said central CS database in said reduced tag set specification.

28. The method claim 27 wherein said processing rules depend at least in part upon values of data within said PID tags.

29. The method of claim 23 further comprising providing retailers GUI and/or scripts access to instruct said central CS to perform the following actions:
 (a) define trigger criteria and rewards criteria inter alia based upon PID, and
 (b) define trigger data and rewards data inter alia based upon PID;
 (c) define rewards data associations with trigger criteria and trigger data; and
 (d) define constraints between items (a)-(c); and
 (e) define, transmit to, and receive instructions for transmitting and receiving data, including transaction data, trigger data, and rewards data, to and from said central CS.

* * * * *